(12) United States Patent
Nair et al.

(10) Patent No.: US 8,097,990 B2
(45) Date of Patent: Jan. 17, 2012

(54) ELECTRICAL GENERATOR THAT UTILIZES ROTATIONAL TO LINEAR MOTION CONVERSION

(75) Inventors: Balakrishnan Nair, Sandy, UT (US); Jesse Alan Nachlas, Salt Lake City, UT (US); Andrew Joseph Gill, Salt Lake City, UT (US)

(73) Assignee: Oscilla Power Inc., Salt Lake City, UT (US)

( * ) Notice: Subject to any disclaimer, the term of this patent is extended or adjusted under 35 U.S.C. 154(b) by 0 days.

(21) Appl. No.: 12/852,101

(22) Filed: Aug. 6, 2010

(65) Prior Publication Data
US 2010/0308670 A1  Dec. 9, 2010

Related U.S. Application Data

(60) Provisional application No. 61/305,912, filed on Feb. 18, 2010.

(51) Int. Cl.
*H02K 35/00* (2006.01)
(52) U.S. Cl. .......................... 310/24; 290/55
(58) Field of Classification Search .............. 290/52, 290/54, 55; 310/20, 24, 37, 80
See application file for complete search history.

(56) References Cited

U.S. PATENT DOCUMENTS

| 5,354,083 | A | 10/1994 | Liu |
| 5,631,507 | A | 5/1997 | Bajric et al. |
| 6,952,060 | B2 | 10/2005 | Goldner et al. |
| 7,116,006 | B2 | 10/2006 | McCoin |
| 7,245,042 | B1 * | 7/2007 | Simnacher ............ 290/55 |
| 7,629,713 | B2 | 12/2009 | Beaulieu |
| 2005/0244276 | A1 * | 11/2005 | Pfister et al. ............ 417/12 |
| 2007/0137614 | A1 | 6/2007 | Tsuzuki |
| 2007/0210659 | A1 * | 9/2007 | Long ................ 310/80 |
| 2008/0105081 | A1 | 5/2008 | Whittington |
| 2009/0243304 | A1 | 10/2009 | Stein |
| 2010/0084928 | A1 * | 4/2010 | Yoshida et al. ............ 310/15 |
| 2010/0276938 | A1 * | 11/2010 | Smith ............ 290/55 |
| 2011/0080003 | A1 * | 4/2011 | Smith ............ 290/55 |

OTHER PUBLICATIONS

Copenheaver, Blaine R. PCT International Search Report for PCT/US2011/025333, (Feb. 17, 2011), 1-3.
Copenheaver, Blaine R. PCT Written Opinion of International Searching Authority for PCT/US2011/025333, (Feb. 17, 2011), 1-5.

* cited by examiner

*Primary Examiner* — Nguyen N Hanh
(74) *Attorney, Agent, or Firm* — Jeffrey T. Holman (57) ABSTRACT

A method and device for energy conversion from a moving fluid to electrical energy. The device includes at least one magnetic structure, at least one coil structure, a rotating component, and a rotary to linear motion conversion mechanism. The at least one coil structure includes electrically conductive material. The rotating component rotates relative to a corresponding axis of rotation in response to forces applied by the moving fluid on a structure coupled to the rotating component. The rotary to linear motion conversion mechanism is coupled to the rotating component. Rotation of the rotating component around the corresponding axis of rotation generates a relative linear displacement between the at least one magnetic structure and at least one coil in the at least one coil structure. The relative linear displacement between the at least one magnetic structure and the at least one coil generates electrical energy in the at least one coil structure.

19 Claims, 8 Drawing Sheets

| Generator Parameters | | |
|---|---|---|
| Generator Planet RPM | 95.0 | |
| Key Diameter of Generator (Rolling surfa | 4.8 | m |
| Length of Generator | 1.34 | m |
| Number of Plates | 5 | |
| Coil Turn Density | 2166 | Turns/m |
| Coil Length | 33.5 | cm |
| Max Average B1 (Gauss) | 3800 | gauss |
| Min Average B1 (Gauss) | 600 | gauss |
| Copper Wire Gauge | 11 | AWG |
| Load Resistance | 854.9 | Ohms |
| Plate Oscillation Frequency | 1.6 | Hz |
| Magnet Rods/Plate (Linear) | 1 | |
| Generator Tangential Speed | 24.0 | m/s |
| Magnets Rods/Plate (Area) | 1 | |
| Magnet through Coil Frequency | 26.9 | Hz |
| Circumference of Rolling Surface | 15.1 | m |
| Diameter of Plates | 0.867 | m |
| Coil square side | 0.56 | m |
| | | |
| Coil Area | 3.12E-01 | m2 |
| DFB (webers) | 1.0E-01 | Webers |
| DFB/Dt | 5.3743 | Wb/s |
| Number of turns of coil/Magnet Rod | 1450 | |
| Av. Voltage/Plate/Magnet Movement | 7792.7 | V |
| Nett Av. Voltage/Magnet Movement | 38964 | V |
| Copper Wire Internal Resistance/Plate | 13.383 | Ohms |
| Coil Wire Length/Plate | 3239.57 | m |
| Total Copper Wire Weight | 1.20 | Tons |
| Nett Internal resistance | 66.9 | Ohms |
| Average Current/Magnet Movement | 42 | Amps |
| Average Linear Speed | 1 | m/s |
| | | |
| Av. Power | 1527 | kW |

FIG. 4A

| Magnet Dimensions and Weight | | |
|---|---|---|
| Magnets/Rod | 17 | |
| Single Magnet Leng | 0.78 | inches |
| Magnet Length/Rod | 13.18 | inches |
| Square Side | 21.6 | inches |
| Density | 5000 | kg/m3 |
| Volume | 0.50 | m3 |
| Magnet Weight | 2.51 | Tons |
| | | |
| Copper Coil Weight | 1.20 | Tons |
| | | |
| Estimated Balance Wt | 5.84 | Tons |
| | | |
| Estimated Net Weight | 9.54 | Tons |
| | | |
| Coil Considerations | | |
| Coil wire thickness | 0.09 | inches |
| Turns/Layer/Magnet Rod | 145 | |
| No of Layers | 10 | |
| Coil winding thickness | 0.91 | inches |
| | | |
| Tons/Km | 0.0371 | |
| Ohms/Km | 4.131 | |
| | | |
| Magnet Dimensions and Weight | | |
| Magnets/Rod | -15 | |

Notes
1. C-8 Ceramic ferrite magnets used
2. This is an average power estimate with a triangular flux change waveform assumption
3. Plateatary gear system with each planet coupled to a camden gear to drive a plate with a magnet array through a coil array.

FIG. 4B

| Plates in Series (Must be a factor of the number of plates) | | | | | | |
|---|---|---|---|---|---|---|
| 5 | | | | | | |
| | | | | | | |
| Segments in Parallel | | | | | | |
| 1 | | | | | | |
| | | | | | | |
| | | | | | Operation Conditions | |
| | | | | | Wind Speed | |
| | | | | | 9.3 | m/s |
| Rotor Paramaters | | | | | | |
| Rotor Diameter | | 82.5 | m | | Air Density | |
| Rotor RPM | | 19.0 | | | 1.225 | kg/m3 |
| Power Coefficient | | 0.58 | | | | |
| Rotor power | | 1527 | kW | | | |
| Rotor Torque | | 767.7 | kNm | | | |
| | | | | | | |
| Rotor-Generator Reducer | | | 5 | | Magnetic Force/Coil | |
| Generator Torque | | | 153.5 | | 12753.170 | N |
| Generator Planet RPM | | | 95 | | | |
| | | | | | Nett Magnetic Force | |
| | | | | | 63765.851 | N |
| | | | | | | |
| Average Power | | 20 | | Average Torque | | |
| Rotor | Generator | | | Rotor | Generator | |
| 1527 | 1527 | | | 154 | 154 | kNm |
| | | | | | | |
| Ratio | 0.9999 | | | Ratio | 1.0000 | |
| | | | | | | |
| kW/Ton | | $/kW | | | | |
| 160.0 | | $25 | | | | |

FIG. 4C

ELECTRICAL GENERATOR THAT UTILIZES ROTATIONAL TO LINEAR MOTION CONVERSION

CROSS-REFERENCES TO RELATED APPLICATIONS

This application claims the benefit of U.S. Provisional Application No. 61/305,912, filed Feb. 18, 2010, and entitled "Electrical Generator that Utilizes Rotational to Linear Motion Conversion."

BACKGROUND

There is a continuing effort to reduce the cost, weight, and size of electrical generators, especially for applications where the generator is installed in remote locations or at heights or elevations. One example of an application where a cheaper, lighter, and/or smaller generator can have a significant advantage is in wind turbines, where the generator typically is installed on a tower.

SUMMARY

Embodiments described herein include a device for energy conversion from a moving fluid to electrical energy. The device includes at least one magnetic structure, at least one coil structure, a rotating component, and a rotary to linear motion conversion mechanism. The at least one coil structure includes electrically conductive material. The rotating component rotates relative to a corresponding axis of rotation in response to forces applied by the moving fluid on a structure coupled to the rotating component. The rotary to linear motion conversion mechanism is coupled to the rotating component. Rotation of the rotating component around the corresponding axis of rotation generates a relative linear displacement between the at least one magnetic structure and at least one coil in the at least one coil structure. The relative linear displacement between the at least one magnetic structure and the at least one coil generates electrical energy in the at least one coil structure. Other embodiments of the device are described below.

Embodiments described herein include an apparatus for wind energy conversion from a moving fluid to electrical energy. The apparatus includes at least one magnetic structure, at least one coil structure, a rotating component, and a gear mechanism. The gear mechanism is coupled to the rotating component to produce a relative linear displacement between the at least one magnetic structure and the at least one coil structure. The relative linear motion is related to a rotation of the rotating component about a corresponding axis of rotation. The relative linear displacement generates electrical energy in the at least one coil structure. Other embodiments of the apparatus are described below.

Embodiments described herein include a method for converting energy from a moving fluid to electrical energy. The method includes rotating a rotating component relative to a corresponding axis of rotation. The method also includes converting the rotation of the rotating component to a relative linear displacement of a first generation component using a rotary to linear motion conversion mechanism. The method also includes displacing the first generation component relative to a second generation component. The relative linear displacement is along a substantially linear path in a non-perpendicular direction relative to the corresponding axis of rotation of the rotating component. The method also includes generating electrical energy based on the relative linear displacement of the first generation component and the second generation component. Other embodiments of the method are described below.

Other aspects and advantages of embodiments of the present invention will become apparent from the following detailed description, taken in conjunction with the accompanying drawings, illustrated by way of example of the principles of the invention.

BRIEF DESCRIPTION

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Embodiments described herein address innovative electrical generator designs that allow reduction in cost, weight, and/or size of electrical generators compared with conventional electrical generator designs. The most common method for converting energy of a moving fluid to electrical energy in a permanent magnet electrical generator is to attach magnets to a rotating shaft where the magnets pass by copper wire coils as the magnets rotate with the shaft, resulting in changing magnetic flux relative to the copper coils, which generates electrical power. In the present description, devices and methods are disclosed for first converting the rotary motion of a rotating shaft that is driven by wind energy, or the motion of some fluid, into oscillating linear motion. The linear motion is then used to move a magnet relative to (e.g., into and away from) a conductive coil, such as a copper coil. There are a variety of ways in which the rotary motion can be converted into linear motion, and a few examples are described below. In one embodiment, the linear motion results in at least one magnet moving in and out of a coil.

Some embodiments described herein include methods and devices that convert rotational motion to one or more linear motions that result in a magnet being moved relative to an electrical coil so as to generate a voltage and/or current in the coil. Other embodiments include methods and devices that convert rotational motion to one or more linear motions that result in a magnet being moved partially or fully in and out of an air-cored electrical coil so as to generate a voltage and/or current in the coil. Several embodiments of the invention are described below.

There are a variety of rotary to linear motion conversion mechanisms to convert rotary motion to linear motion (in an axial, radial, or other direction); description of any of the mechanisms known for this purpose in no way limits the scope of this invention. A few examples of a rotary to linear motion conversion mechanism include using a gear system, using a wavy surface that pushes and releases a piston rod, or using a system that utilizes magnetic forces to generate linear motion. In some cases, the mechanism for converting to linear motion does not result in an oscillating motion, but in a motion that pushes the magnet in only one direction; in that case a spring system (or other mechanism to induce movement) may be included to help provide the energy for the return stroke of the oscillating motion.

Figure 1A:
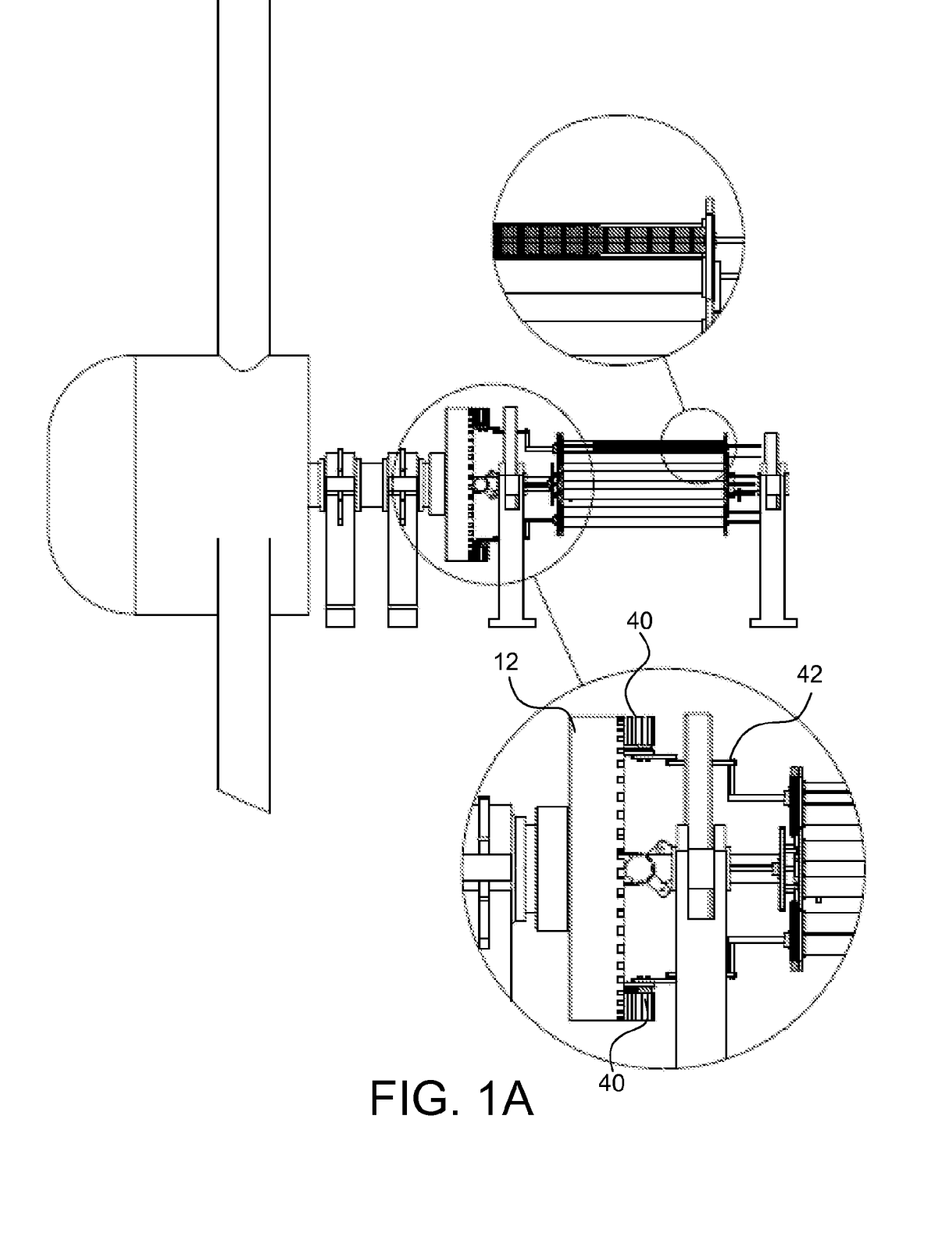
FIGS. 1A-B illustrate schematic diagrams of one embodiment of a generator.
Figure 1B:
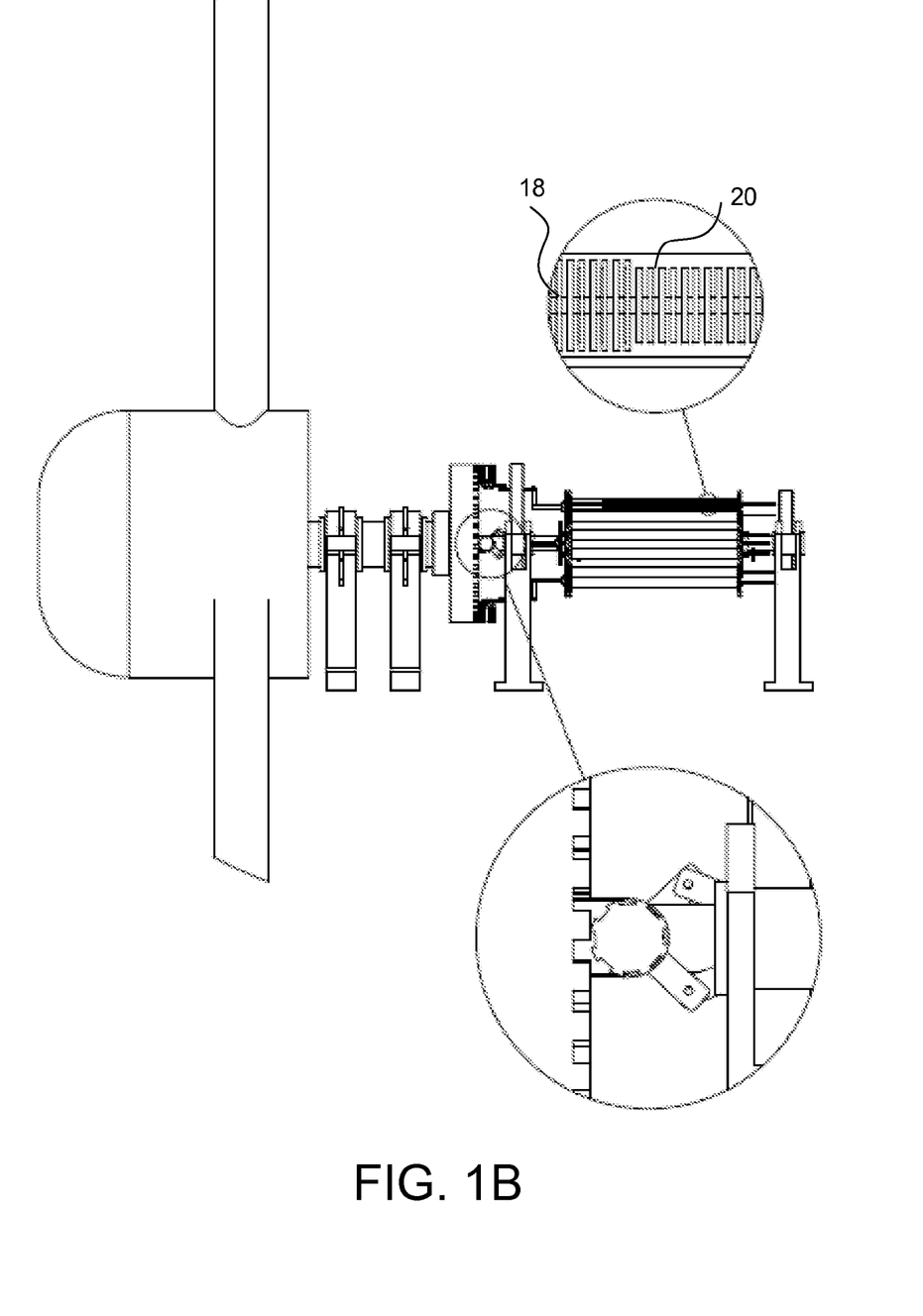

Other embodiments of the present invention are shown in FIGS. 1A-B wherein the linear motion of the magnets moving through the coils is substantially parallel to the axis of rotation of the rotor shaft. In this case a primary gear 12 is connected as part of the rotor shaft which in turn is connected to one or more pinion gears 40 with fewer numbers of teeth in the small pinion gears 40 relative to the primary gear 12. This serves the purpose of increasing the frequency by increasing the number of revolutions of the multiple small gears 40 relative to the large gear 12 attached to the rotor shaft. Additionally, the primary gear 12 and pinion 40 may constitute a face gear system comprising a primary gear and one or more pinion gears, which changes the axis of rotation by 90 degrees. Thus, when a crank slider mechanism 42 is connected to the pinion gears 40 the linear motion of the moving magnets can run substantially parallel to the rotation axis of the rotor shaft. FIGS. 1A-B show 4 small face gears 40 with crank sliders 42 that are driving separate magnet arrays 18 through coils 20 (see magnified portion of FIG. 1B). The small face gears 40 with crank sliders 42 can be setup so that the magnet array strokes are either in phase or out of phase with each other depending on the power generation application.

Figure 2A:
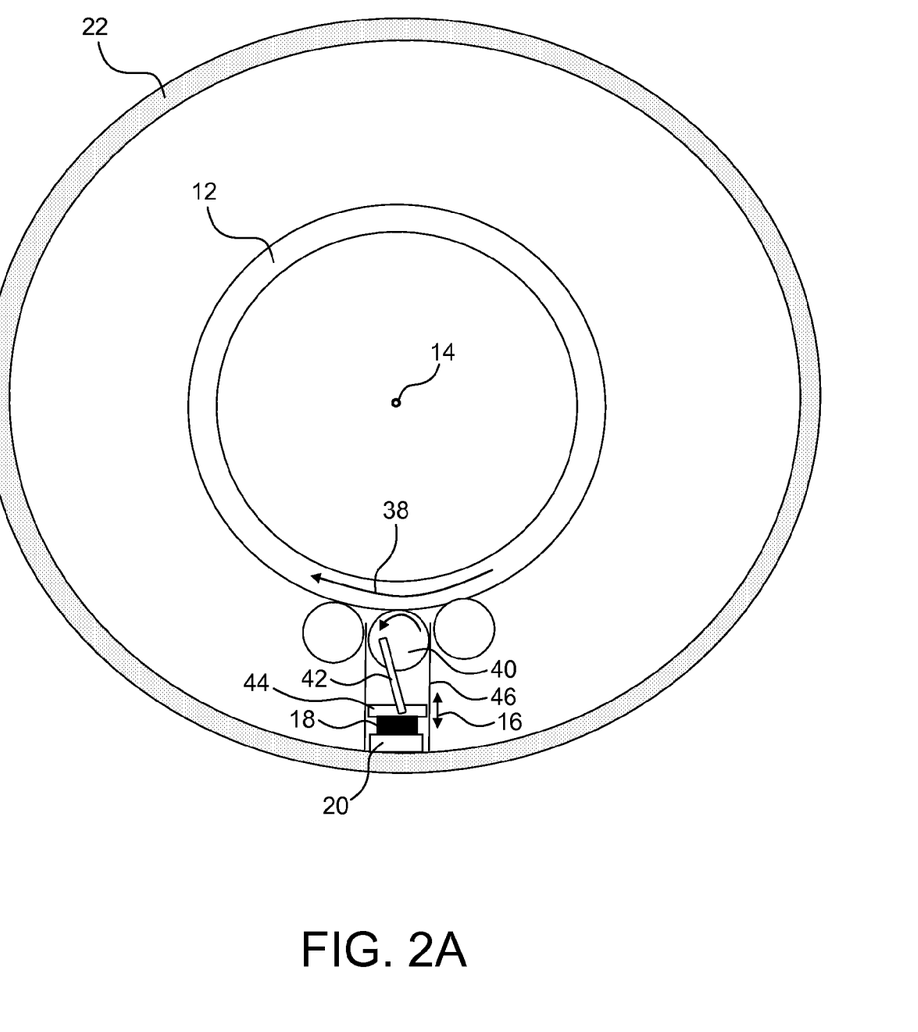
FIGS. 2A-B illustrate schematic diagrams of one embodiment of the generator of FIG. 1 with a rotary to linear motion conversion mechanism.
Figure 2B:
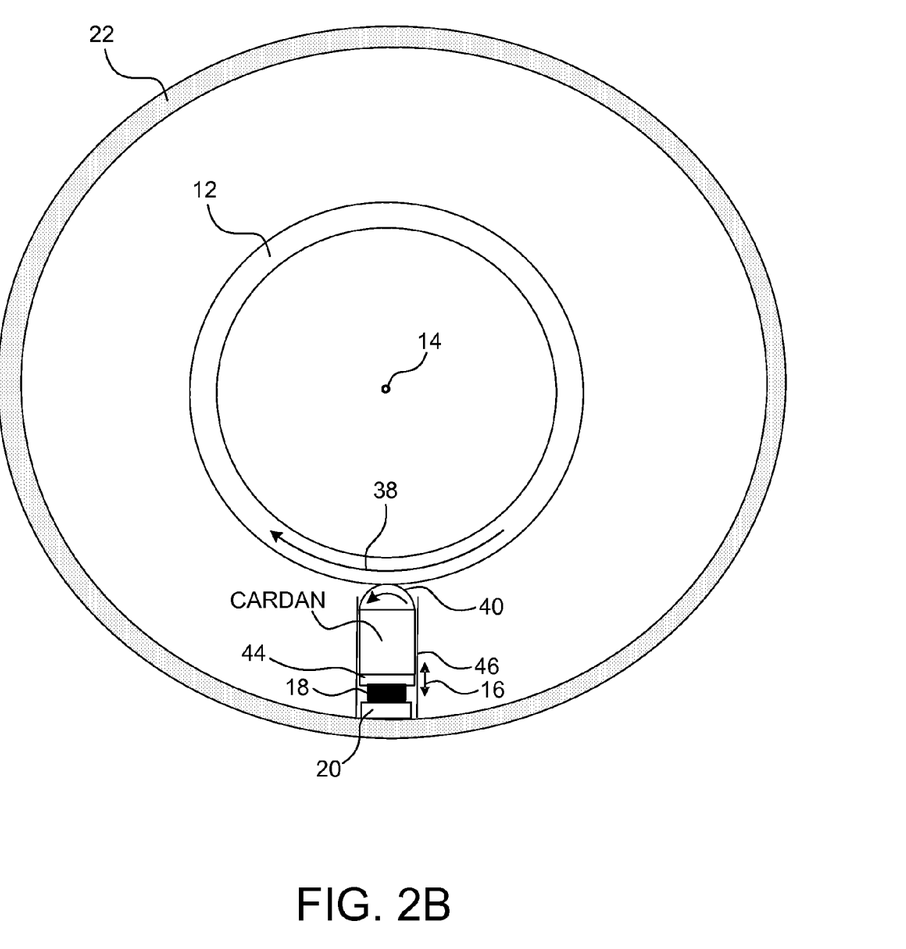

Other embodiments for converting rotary to linear motion are shown in FIGS. 2A-B. The illustrated embodiments include the primary gear 12 (with the reference axis 14), the mounting structure 22 (which circumscribes the shaft in this case), the movable structure 18 (e.g., magnet), and the fixed structure 20 (e.g., coil). The illustrated embodiments also include a pinion gear 40 that is mechanically coupled to the primary gear 12 and rotates due to the rotation of the shaft. In the illustrated embodiment of FIG. 2A, a crank rod 42 attaches to the rotating structure 40 and, as the rotating structure 40 rotates, causes a magnet support plate 44 to move linearly in a radial direction shown by arrow 16 within a housing 46. The movable structure (e.g., magnet) is attached to the magnet support plate 44 and, hence, moves linearly in a radial direction due to the rotational motion of the shaft. While FIGS. 2A-B show embodiments where the motion of the magnet support plate 44 is in the radial direction, embodiments with gear designs where this motion is in any arbitrary direction relative to the reference axis of the shaft are also within the scope of this invention. The pinions may also be mechanically coupled directly to the shaft without the primary gear being a separate component, but just a feature on the shaft.

Thus, the illustrated embodiment utilizes a large central rotating shaft, or a gear directly coupled to a rotating shaft (or primary gear), that is coupled to the blades which provide the rotating motion due to a moving fluid such as wind. The primary gear can be constructed with gear teeth (not shown) on the perimeter such that the gear teeth are capable of engaging the gear teeth from one or more pinion gears. Examples of this type of gear configuration include planetary gears or epicyclical gears, and the word pinion in this description may be considered to represent any secondary gear whose gear teeth are in contact with the gear teeth of the primary gear, and is not limited by any specific geometry, location, size or configuration of the secondary gear. The size and number of the gears can be varied to achieve different frequencies of oscillation for the linear motion. In one embodiment, the number of gear teeth in pinion is less than the number of gear teeth of the primary gear. This results in multiple revolutions of the small pinions for each single rotation of the large central gear shaft. For example, the gear teeth ratio may be designed to produce 10 revolutions of at least one pinion for a single revolution of the primary gear. Increasing the number of revolutions of the pinions relative to the primary gear results in more linear oscillations per rotation and thus higher rate of change of magnetic flux through the coil structure resulting in greater power production. In order to obtain linear motion, the primary gear or pinions may be designed with a crank rod as part of the construction such that, as the primary gear rotates, the crank rod moves in an oscillating linear motion shown by arrow 16. This type of gear with a crank rod, commonly referred to as a crank slider, is utilized for converting rotary motion to linear motion. Another type of gear used for rotary to linear motion conversion is known as a "Cardan gear" (refer to FIG. 2B) where the rod moves in a pure linear motion without the need to provide a channel to contain the linear motion. Alternatively, instead of a crank rod, it is possible to use a cam type system such that as the primary gear or pinion rotates it also spins a cam that pushes on a piston rod. It should be noted that the length of the linear stroke can also be varied by changing the diameter of the primary gear or pinion and/or the design of the cam. Thus, these parameters will then influence the frequency of oscillation and the size of the magnets.

Although FIG. 2A and FIG. 2B both show a large central shaft with three pinions(s), other embodiments may have fewer or more pinions. Similar pinions can be positioned all around the shaft. The arrows indicate directions of motion, showing that as the primary gear that is coupled to the shaft turns the gear teeth engage a smaller pinion that accomplishes multiple revolutions for each single revolution, the crank rod moves in a cyclic linear motion resulting in a magnet moving into and away from a copper wire coil. Alternatively, it is possible to have the coil connected to the rod and the magnet stationary, the end result being the same of producing relative motion between a magnet and copper wire coil.

In any of the methods and devices described herein, the magnets may be permanent magnets or electromagnets (e.g., in grid connected systems). The type of magnet used in a specific implementation in no way limits the scope of other embodiments of this invention. In some embodiments, the magnets may be low-cost permanent magnets such as ferrites or Alnico, as well as rare earth magnets, or a combination of different type magnets.

It should also be noted that similar mechanisms may be implemented to generate movements in directions other than in the radial or axial direction of a rotating shaft. For example, some embodiments may use similar structures (refer to FIGS. 2A-B) placed around a circumference of a rotating shaft in order to generate substantially equivalent movements in an arbitrary direction, rather than in the axial or radial direction. Other methods of converting rotary motion to linear motion such as cardan gears, crank sliders etc may be used in combination with any of the embodiments described herein.

In any of the methods and devices described herein, the magnetic structure may include magnets arranged in arrays and/or rows such that each stroke of linear motion results in each magnet moving through more than one coil, and/or one or more magnets to move through each coil. For example, the magnets may be arranged in a linear array, within a coil array with spacing equal to or comparable to the magnet length along the axis of motion, such that a single linear stroke driven by the rotary motion may result in each magnet moving through more than one of the coils. Embodiments that utilize this type of magnet configuration can result in much higher rates of magnetic flux change as the effective frequencies far exceed the RPM of the rotating shaft. The type of magnet array used in a specific implementation in no way limits the scope of other embodiments of this invention.

In any of the methods and devices described herein, there may be one or more components/materials incorporated to control the magnitude and or direction of magnetic flux generated by one or more permanent magnets. For example, in a magnet array, one or more materials/components with high magnetic permeability (e.g., mild steel or electrical steel) may be included to limit the flux leakage into the coils while the magnets are physically outside of the coils. One or more components with high magnetic permeability may be used near the magnetic poles to redirect/reorient the magnetic flux lines to limit leakage fluxes as well. The type and configuration of magnetically permeable materials used in a specific embodiment, in no way, limits the scope of this invention.

Figure 4A:
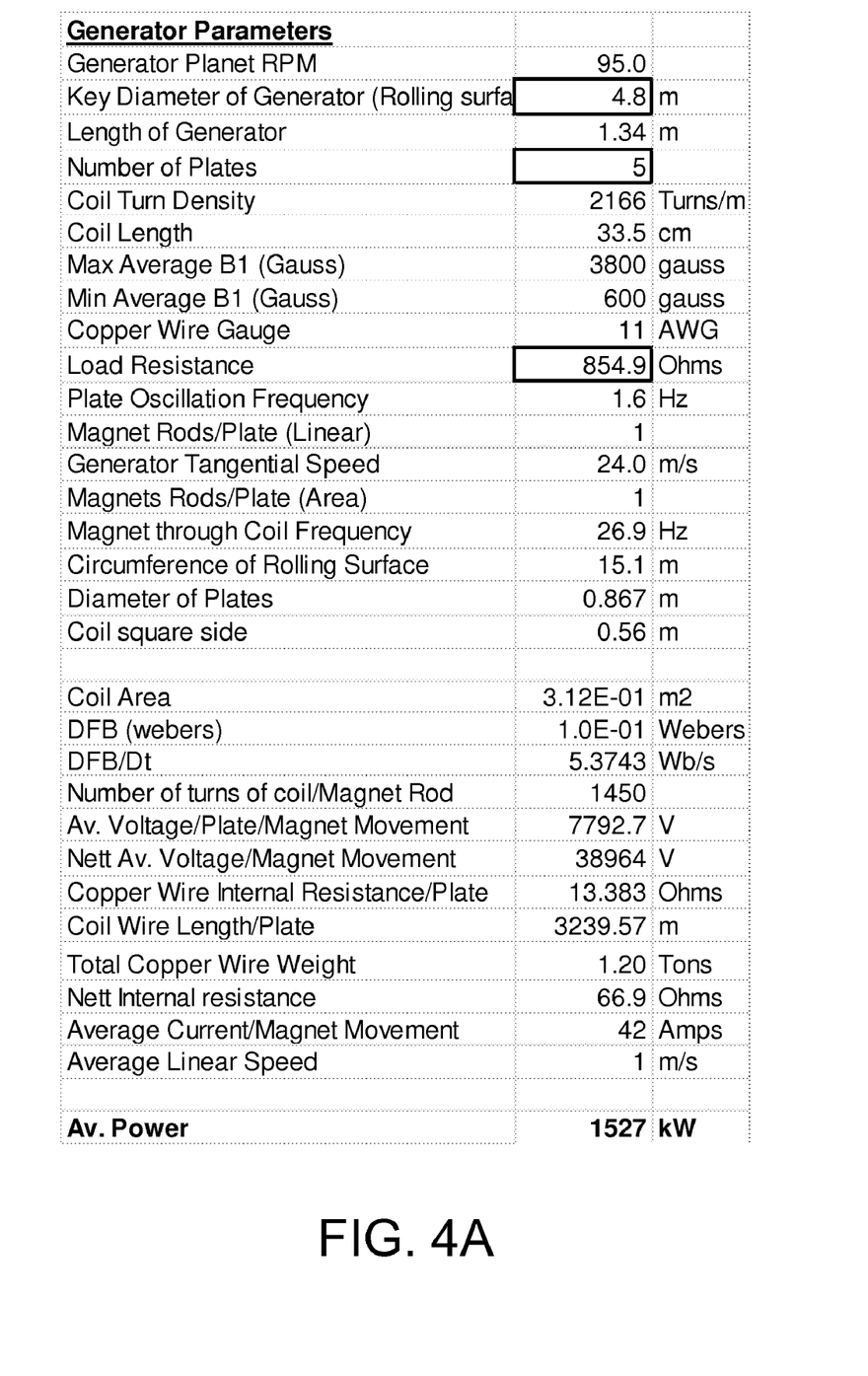
FIGS. 4A-C illustrate tabulated data corresponding to the generator of FIG. 1.
Figure 4B:
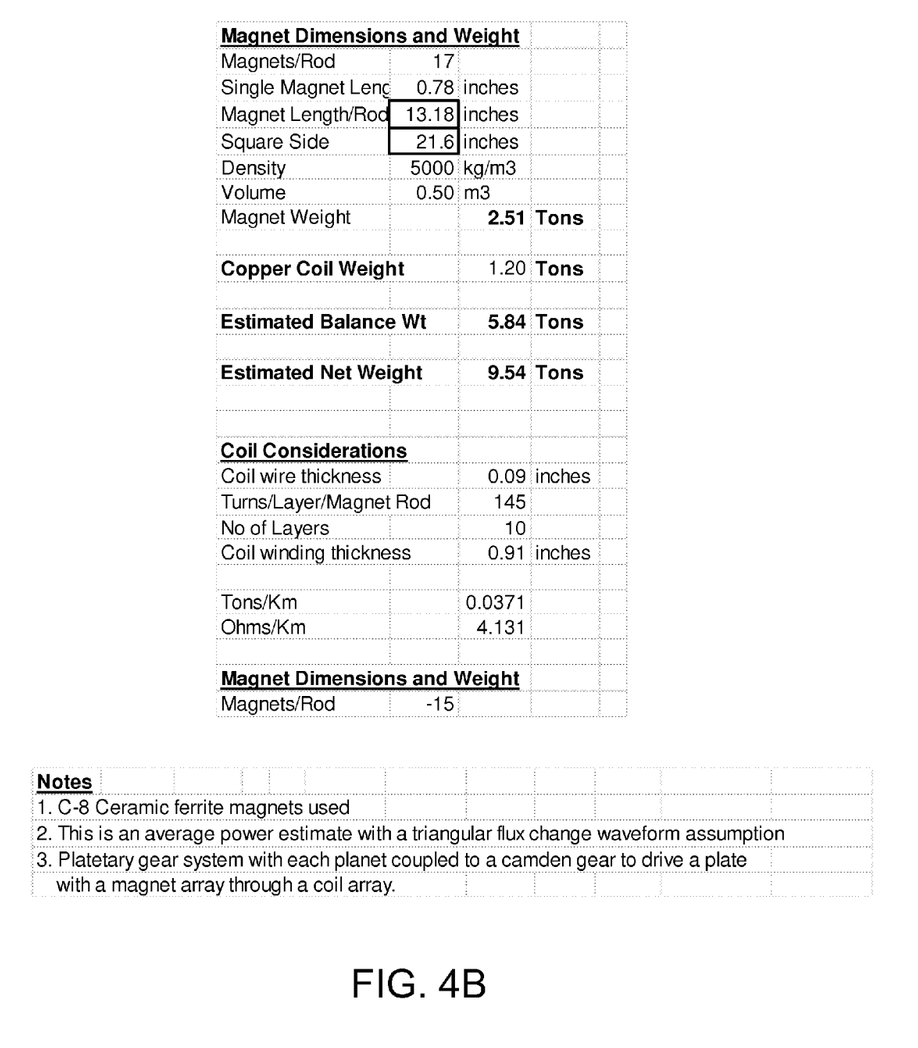
Figure 4C:
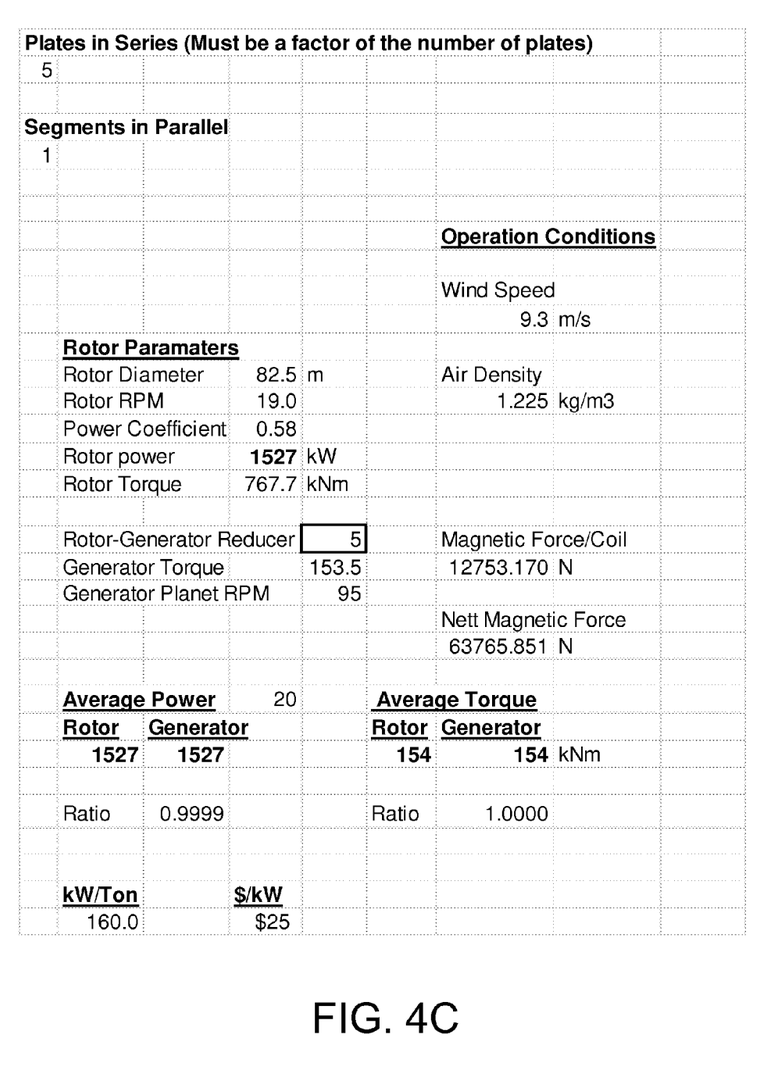

Although FIG. 4 is shown as FIGS. 4A, 4B, and 4C for simplicity, the data in each of FIGS. 4A, 4B, and 4C will be collectively referred to herein as FIG. 4. FIG. 4 shows an example with calculated parameters for an embodiment of the present invention. Although not shown in the figures, the embodiment considered in the calculation here has a rotor connected to the ring and core of a planetary gear with 5 planets. Each planet is coupled with a rotary to linear motion converter such as a cardan gear type system that moves a support plate with a number of magnet arrays. As the rotor turns, the ring rotates and the planets spin in place driving a linear stroke of a plate holding the magnets. In one embodiment, there are twice as many coils as magnets and on each linear stroke, each magnet moves in and out of many coils (i.e. power generation frequency is much higher than the planet rotational frequency). For a certain rated wind speed and rotor size and target RPM, the inner diameter of the ring, number of magnets, magnet dimensions, and load resistance can be determined to allow the power/torque of the rotor and generator to be matched.

Another embodiment includes a device such as a linear electrical generator that utilizes a magnet array configured such that adjoining magnets in the array have similar poles facing each other and displaced at a spacing comparable to, and in some embodiments equal to, the thickness of the magnets (i.e. the dimension of the magnets in the direction of motion). Configuring the magnets this way allows for flux to change by up to two times the strength of an individual magnet as adjoining magnets pass through each coil during a single linear stroke. In one embodiment which uses permanent magnets, the magnets have high resistance to demagnetization. Ferrite magnets and rare earth magnets may be suitable for this embodiment. Individual coils are wired together so that the voltages/currents sum up as desired. It should be noted that this embodiment may be used in conjunction with, or independent of, any of the previous embodiments described herein, or other similar embodiments.

In some embodiments a cam type structure can be used to convert the rotary motion of the shaft into linear oscillating motion. Utilizing this type of cam shaft system with the large central rotating shaft enables moving multiple magnets in a linear oscillating motion. In order to increase the frequency of oscillation of a single magnet component, which is either a single large magnet or a flat plate containing many smaller magnets, multiple cams along the shaft can be used to drive the motion of the magnet component. In one embodiment, four separate cams that are each attached to the central rotating shaft are offset by 90 degrees with the result being that four oscillations of the magnet plate are generated per rotation of the central shaft. In another variation of this embodiment four separate piston rods that are each attached to a magnet plate component are offset by 90 degrees such that as a single cam goes through one full revolution it drives for different piston rods at each 90 degree location. In this case, the generator can be constructed with four quadrants that surround the cylindrical shaft so that as each cam rotates, it causes four separate magnet components to undergo a single oscillation. Using this design strategy the frequency of oscillations can be increased relative to other generator designs. Although this example references four different magnet structures driven by a single cam, other embodiments may use any number of magnet structures in combination with any number of cam structures.

Figure 3:
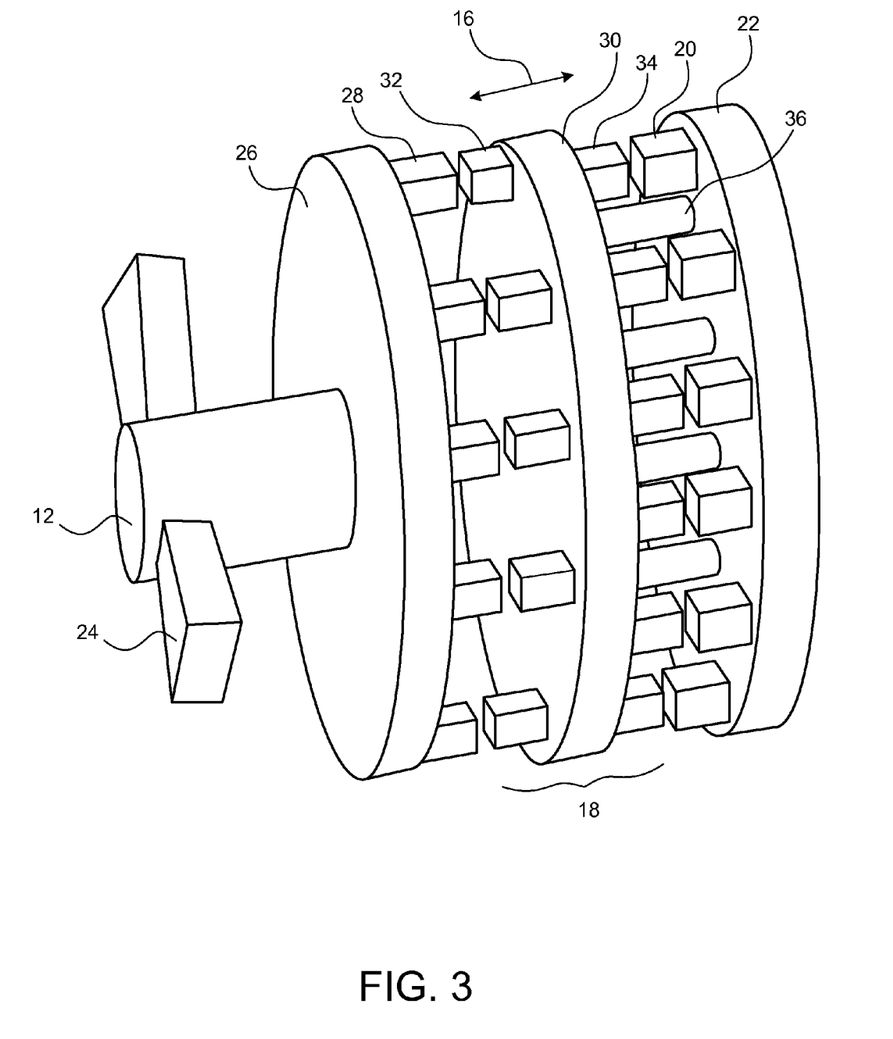
FIG. 3 illustrates a schematic diagram of one embodiment of a fluid motion generator with magnetic loading.

In some embodiments, utilizing magnetic forces to move the energy generating magnet structure can help reduce or minimize wear by preventing physical contact between any surfaces to convert the rotational motion to linear motion. To achieve this some embodiments utilize one or more magnets to create repulsive and/or attractive forces to create linear motion from rotational motion. FIG. 3 illustrates one embodiment in which two plates (i.e., the rotor and the moveable magnet support plate) face each other with magnets of similar polarity facing each other such that as the rotor rotates, the magnetic repulsion forces between at least one pair of magnets causes a movable plate (i.e., the moveable support plate) with at least one magnet (or coil) mounted on it to move relative to another plate (i.e., the mounting structure) with at least one coil (or magnet) mounted on it, such that the change in magnetic flux caused by this relative motion causes a current and/or voltage in the coil. In one embodiment, the structure is configured so that the magnet or magnets move at least partially in and out of an air cored coil.

FIG. 3 shows one embodiment, which includes one or more blades 24 mounted to a shaft 12. As fluid flows over the blades, the shaft rotates and turns a rotor 26. One or more magnets 28 are mounted to the rotor and are oriented to move the movable structure 18, which in the illustrated embodiment includes a support plate 30 with magnets 32 and 34 attached to both sides. The magnets 32 attached to the side nearest the rotor 26 are arranged and oriented to experience a force of repulsion as the corresponding magnets 28 move past in a circular motion. Depending on the layout of the magnets 28 and 32, the repulsive forces can move the entire movable plate in the direction shown by the arrow 16. As the plate 30 moves away from the rotor 26, the magnets 34 nearest the mounting structure 22 move relative to the electrical coils 20 and produce electricity. Springs 36 or other device may be used to help move the plate 30 back toward the rotor 26, enabling an oscillating linear motion in the axial direction. As another example, some of the magnets 28 attached to the rotor may be oriented to provide attractive forces to help draw the movable plate 30 back toward the rotor, in addition to or in place of the spring forces. It should also be noted that the description of embodiments utilizing repulsive or attractive forces may be reversed such that some embodiments may utilize only repulsive forces, some embodiments may utilize only attractive forces, and some embodiments may utilize a combination of repulsive and attractive forces.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device for conversion of energy from a moving fluid to electrical energy, the device comprising:
   at least one magnetic structure;
   at least one coil structure comprising electrically conductive material;
   a rotating component to rotate relative to a corresponding axis of rotation in response to forces applied by the moving fluid on a structure coupled to the rotating component;
   at least one primary gear coupled to the rotating component; and
   a plurality of rotary to linear motion conversion mechanisms, wherein each rotary to linear conversion mechanism comprises a pinion coupled with the at least one primary gear;
   wherein rotation of the rotating component around the corresponding axis of rotation generates rotation of the at least one primary gear, rotation of the pinion of each rotary to linear motion conversion mechanism, and relative linear displacements between at least one magnetic structure and at least one coil structure in each of the rotary to linear motion conversion mechanisms;
   wherein the relative linear displacement between the at least one magnetic structure and the at least one coil structure in each rotary to linear conversion mechanism generates electrical energy in the at least one coil structure of each rotary to linear conversion mechanism.

2. The device of claim 1, wherein the relative linear displacement is oriented at some non-perpendicular direction relative to the corresponding axis of rotation of the rotating component.

3. The device of claim 1, wherein the relative linear displacement between the at least one magnetic structure and the at least one coil is along a direction substantially parallel relative to the corresponding axis of rotation of the rotating component.

4. The device of claim 1, wherein the at least one magnetic structure comprises a permanent magnet array, wherein adjoining magnets in the permanent magnet array have like poles facing each other.

5. The device of claim 1, wherein the at least one coil structure comprises a coil array.

6. The device of claim 5, wherein a spacing between magnets in the permanent magnet array is substantially similar to a spacing between coils in the coil array.

7. The device of claim 1, wherein the at least one magnetic structure or the at least one coil structure comprises one or more high permeability components to provide flux paths and/or increase flux change.

8. The device of claim 1, wherein the rotary to linear motion conversion mechanism comprises at least one magnet to apply magnetic forces on a support structure holding the at least one magnetic structure to facilitate the relative linear displacement of the at least one magnetic structure relative to the at least one coil.

9. An apparatus for conversion of energy from a moving fluid to electrical energy, the apparatus comprising:
   at least one magnetic structure;
   at least one coil structure;
   a rotating component; and
   a gear mechanism coupled to the rotating component, wherein the gear mechanism receives a rotary input and generates a linear output to produce a relative linear displacement between the at least one magnetic structure and the at least one coil structure, wherein the relative linear displacement is related to a rotation of the rotating component about a corresponding axis of rotation, wherein the relative linear displacement generates electrical energy in the at least one coil structure.

10. The apparatus of claim 9, wherein the gear mechanism comprises at least one pinion gear coupled with at least one primary gear, wherein the primary gear is coupled to a main shaft and rotates at a speed substantially equivalent to a speed of the main shaft.

11. The apparatus of claim 10, wherein the pinion gear is configured to rotate at an increased rate compared with the primary gear, and the linear oscillation movement occurs at an increased rate dependent on the rotation of the pinion gear.

12. The apparatus of claim 9, wherein the relative linear displacement between the at least one magnetic structure and the at least one coil structure occurs out of synchronization relative to a second relative linear displacement between a second at least one magnetic structure and a second at least one coil structure in the apparatus.

13. The apparatus of claim 9, wherein the gear mechanism comprises at least one cardan gear.

14. The apparatus of claim 9, wherein the at least one magnetic structure comprises a permanent magnet array, wherein adjoining magnets in the at least one magnetic structure have like poles facing each other.

15. The apparatus of claim 9, wherein the at least one coil structure comprises a coil array and the at least one magnetic structure comprises a magnet array.

16. The apparatus of claim 9, wherein a spacing corresponding to at least two permanent magnets in the at least one magnetic structure is substantially similar to a spacing corresponding to at least two coils in the at least one coil structure.

17. The apparatus of claim 9, wherein the at least one magnetic structure or the at least one coil structure comprises one or more high permeability components to provide flux paths and/or increase flux change.

18. A method for converting energy from a moving fluid to electrical energy, the method comprising:
  rotating a rotating component relative to a corresponding axis of rotation;
  converting the rotation of the rotating component to a relative linear displacement of a first generation component, wherein at least one gear within a gear mechanism is disposed between the rotating component and the first generation component, wherein the gear mechanism receives a rotary input and generates a linear output;
  displacing the first generation component relative to a second generation component, wherein the relative linear displacement is along a substantially linear path in a non-perpendicular direction relative to the corresponding axis of rotation of the rotating component; and
  generating electrical energy based on the relative linear displacement of the first generation component and the second generation component.

19. The method of claim 18, wherein the moving fluid comprises wind.

* * * * *